United States Patent [19]
Sanz et al.

[11] Patent Number: 5,642,022
[45] Date of Patent: Jun. 24, 1997

[54] AIRCRAFT WINDOW SHADE SPEED REGULATION CONTROL SYSTEM

[75] Inventors: Eduardo Sanz; Michael R. Spraggins, both of San Antonio; Dayton R. Pearson, Elmendorf, all of Tex.

[73] Assignee: MSA Aircraft Interior Products, Inc., San Antonio, Tex.

[21] Appl. No.: 565,880

[22] Filed: Dec. 1, 1995

[51] Int. Cl.⁶ .................................. E06B 3/32; H02P 7/68
[52] U.S. Cl. .................................. 318/468; 160/91
[58] Field of Search .................................. 318/466–470, 318/543, 549; 160/7, 88–91, DIG. 17; 49/100, 102, 118, 123, 280, 348, 349; 244/129.3, 129.4

[56] References Cited

U.S. PATENT DOCUMENTS

| | | | |
|---|---|---|---|
| 4,674,713 | 6/1987 | Ryan et al. | 244/122 R |
| 4,679,610 | 7/1987 | Spraggins | 160/107 |
| 4,706,726 | 11/1987 | Nortoft | 160/168.1 |
| 4,814,687 | 3/1989 | Walker | 323/275 |
| 4,864,153 | 9/1989 | McIntosh, Jr. | 307/10.1 |
| 5,082,043 | 1/1992 | Moreno | 160/90 |
| 5,170,108 | 12/1992 | Peterson et al. | 318/469 |

*Primary Examiner*—Brian Sircus
*Attorney, Agent, or Firm*—Gunn, Lee & Miller, P.C.

[57] ABSTRACT

An aircraft window shade speed control system which allows the coordination of window shade movement speed throughout an aircraft using a single set-point device for each window shade. Each window shade is moved by an electric motor, and its travel is limited by upper and lower limit switches. Voltage is applied to each motor by a motor control module that is relatively insensitive to variations in aircraft electric buss voltage and motor current requirements. A remote operation switch allows the pilot of the aircraft to open or close all window shades in the aircraft simultaneously, and to be assured of their ultimate position by observing only the window nearest his own position.

7 Claims, 4 Drawing Sheets

AIRCRAFT WINDOW SHADE SPEED REGULATION CONTROL SYSTEM

FIELD OF THE INVENTION

Applicants' invention relates to aircraft window shades, more specifically to a control system which ensures consistent window shade movement speed among a series of aircraft windows.

BACKGROUND OF THE INVENTION

Presently, aircraft windows are provided in modular form for retrofitting existing aircraft or finishing out newly manufactured aircraft. Because of the unique demands of the aircraft's operating environment, aircraft windows must be lightweight, compact, modular, easy to assemble, durable and have few parts.

Typically, present aircraft window shades are powered by the aircraft's electrical system, or manually operated by the passenger. These shades are raised between an upper and a lower position. Many aircraft are presently fitted with shades located between an outer and an inner pane such that the aircraft passenger does not have direct access to the shade itself; raising and lowering the shade must be effected through either a control switch which engages an electric motor or, in the case of a manually operated window, a lever which is manually positioned by the passenger.

Typically the course of a flight, individual passengers will operate their own window shades so that, at any given time, each shade will be in a different position. However, there are occasions when it is desirable for the pilot or crew to simultaneously open or close all window shades in the aircraft. Electrical control of all aircraft window shades is also required if the pilot or crew operates them en masse. This may be difficult to accomplish successfully, since the pilot can only view those window shades near to his seat and not those in the remainder of the aircraft. Because of mechanical friction and those variations introduced by voltage fluctuations along the aircraft electric power buss, electrical window shades throughout the aircraft will often each operate at slightly different speeds. This being the case, a pilot acting to close or open all of the aircraft's window shades can often not be certain that other window shades in the aircraft are similarly situated to his own.

While the raising and lowering of window shades using electrical controls is known, such devices are usually much more complicated and expensive than would be tolerated in the art of aircraft window design. An example of such a device is disclosed in U.S. Pat. No. 4,706,726 (Nortoft, 1987). This patent addresses the problem of raising and lowering a window along with the separation of slat control from the operations of window shade movement. Such a device would be impractical for use with aircraft windows, since the number of parts required militates against the simplicity, reliability, and lightweight components required for aircraft.

Applicants' invention addresses, in the various embodiments of the aircraft window shade speed control illustrated, described and claimed herein, a problem heretofore either unsuccessfully or not addressed by others in the market.

OBJECTS OF THE INVENTION

It is an object of the present invention to provide a novel electric motor speed control for aircraft window shades.

It is another object of the present invention to provide for an aircraft window shade electronic speed control which can be adjusted using a single set-point element.

It is yet another object of the present invention to provide for an aircraft window shade speed regulation control which is composed of a minimal number of parts and is reliable and lightweight.

It is still another object of the present invention to provide an aircraft window shade speed regulation control which is relatively insensitive to aircraft electric power buss voltage variations.

It is another object of the present invention to provide an aircraft window shade speed regulation control which is relatively insensitive to motor current requirements as they change due to mechanical friction between the window shade its mounting or other factors.

It is yet another object of the present invention to provide an aircraft window shade speed regulation control which can be used with a multiplicity of windows so that a single operator, the pilot for example, may open or close all window shades simultaneously and reliably, even though only a single window can be viewed by the operator.

It is another object of the present invention to provide an aircraft window shade speed regulation control which is disabled by limit-sensing devices located near the upper and lower travel limits of the aircraft window shade.

In satisfaction of these and related objectives, applicants' present invention provides an aircraft window shade speed regulation control having a control module which is relatively insensitive to aircraft buss voltage variations and motor current requirements. The control module is responsive to upper and lower window shade travel limit switches, and the window shade speed of travel is adjustable using a single potentiometer to adjust the output voltage provided to the window shade drive motor.

Applicants' objectives are readily provided for in this invention, and additional objects of this invention will become apparent upon reference to the specifications and claims as more fully set forth below.

SUMMARY OF THE INVENTION

In the instant invention, applicants provide a simple, reliable, and lightweight means for window shade motor speed control in an aircraft window that can be adjusted using a single control. This control is unaffected by aircraft buss voltage variations and motor current variations over the range typically experienced in the aircraft electrical and mechanical speed. The control serves to coordinate the movement environment among all window shades throughout an aircraft.

BRIEF DESCRIPTION OF THE DRAWINGS

The invention is further explained hereinafter with reference to the schematic drawings, in which.

DETAILED DESCRIPTION OF THE PREFERRED EMBODIMENT

Figure 1:
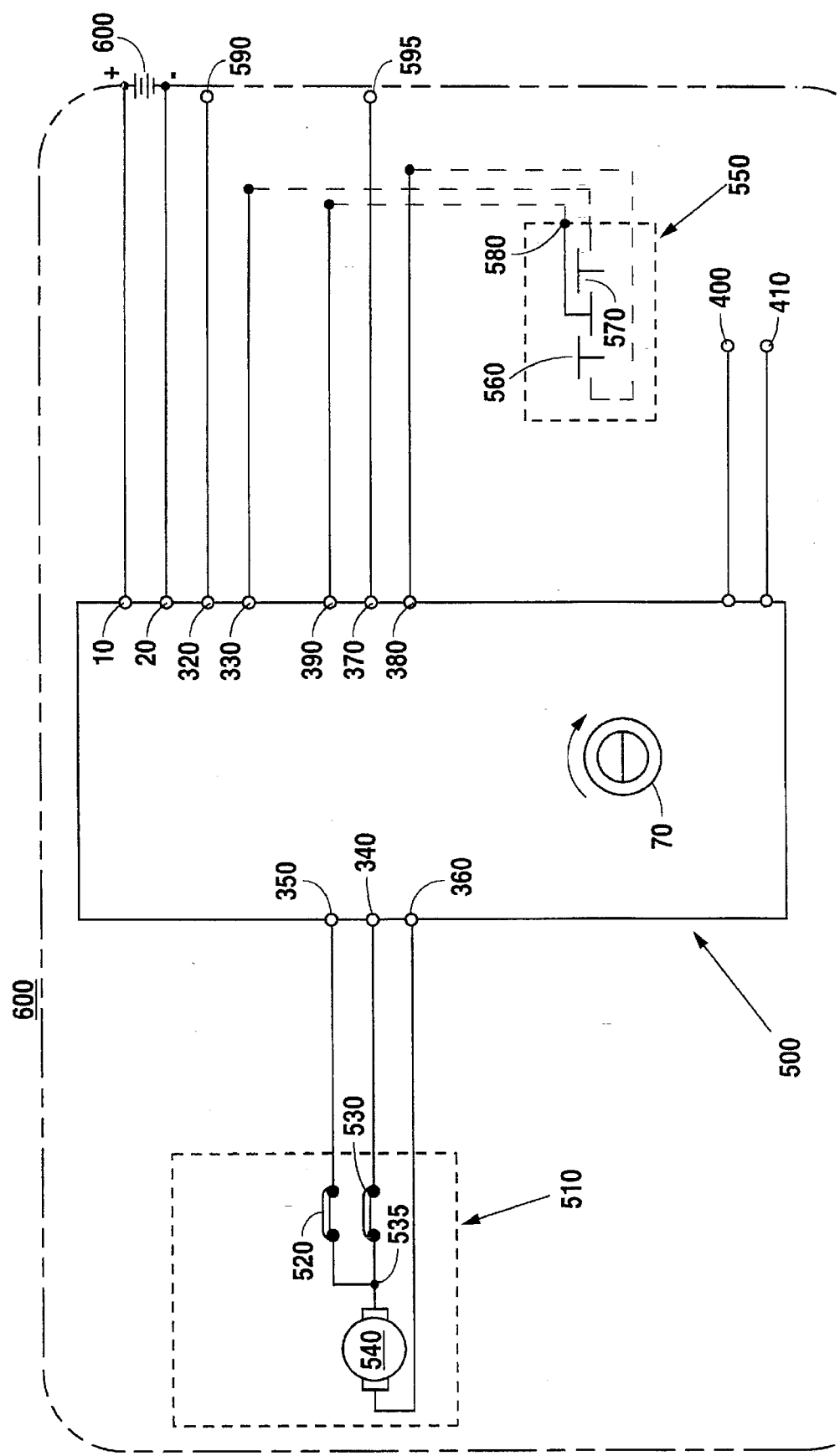
FIG. 1 illustrates the aircraft window shade speed regulation control module of applicants' present invention connected in a simplified configuration to the window shade drive motor assembly and limit switches connected to the output of the controller module.

As can be seen in FIG. 1, applicants' invention consists of a motor control module (500) generally connected to a motor drive assembly (510), an aircraft buss voltage source (600), a remote control switch assembly (550), and several remote control inputs, namely, an up relay brake input (400), a down relay brake input (410), an alternate remote up command input (590), and an alternate remote down command input (595). These remote connections are not necessary to the essential operation of the applicants' invention, but are shown as additions to the preferred embodiment. The single output voltage adjustment potentiometer (70) is also shown on the body of the motor control module (500).

The motor control module (500) operates in the following general manner. An aircraft buss voltage source (600) is connected between the aircraft buss positive power input (10) and aircraft buss negative power input (20) of the motor control module (500). A remote control switch assembly (550) is connected to the motor control module (500) also. Specifically, a remote control switch common junction (580) is connected directly to the control module power common output (390), the remote control down switch (560) is connected to the control module second down command terminal (380), and the remote control up switch (570) is connected to the control module second up command terminal (330). One side of the window shade drive motor (540) is connected to the control module motor common terminal (360). The other side of the window shade drive motor (540) is connected to both the upper limit switch (520) and the lower limit switch (530) at the common point of the motor limit switch terminal (535). The other side of the upper limit switch (520) is connected to the control module upper limit switch terminal (350) and the other side of the lower limit switch (620) is connected to the control module lower limit switch terminal (340).

The motor control module (500) operates as a system for aircraft window shade speed control and is interconnected with the motor drive assembly (510) and remote control switch assembly (550) in the following manner. The aircraft buss voltage source (600) provides power to the motor control module (500). If the upper limit switch (520) and the lower limit switch (530) have not been activated, aircraft power will be passed on to the window shade drive motor (540) whenever either remote control down switch (560) or remote control up switch (570) is depressed by an operator. The speed at which the aircraft window shade is raised or lowered is determined by the relative position of the output voltage adjustment potentiometer (70). If either upper limit switch (520) or lower limit switch (530) is activated by the motion of the aircraft window shade during its travel, power to the window shade drive motor will be interrupted. To stop the movement of the window shade drive motor (540) even more quickly, a shorting connection can be applied across the up relay brake input (400) and the down relay brake input (410). This action causes the motor windings of the window shade drive motor (540) to be shorted together as long as upper limit switch (520) and lower limit switch (530) have not been activated. Also, alternate remote up command input (590) and alternate remote down command input (595) can be used in the same functional manner as remote control up switch (570) and remote control down switch (560) contacts, respectively, if they are each connected to control module power common output (390) by means of a switch or other temporary shorting connector.

Figure 2:
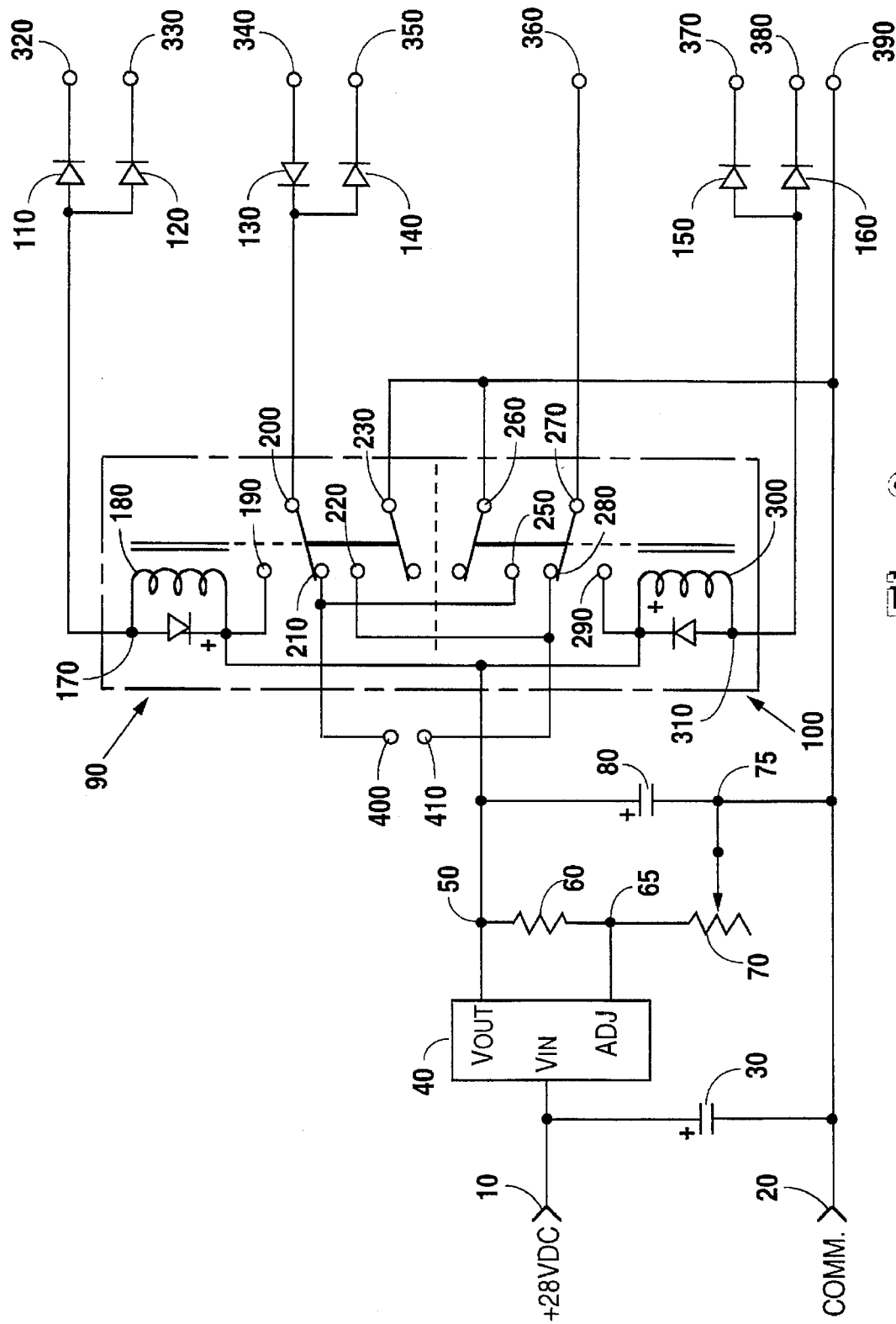
FIG. 2 illustrates an embodiment of an electrical circuit used to effect the functions of the aircraft window shade speed regulation control module of applicants' present invention using output limit switches.

FIG. 2 illustrates the details of motor control module (500) construction. The unregulated aircraft buss voltage of approximately 28 volts DC (VDC) is applied to the motor control module at terminals aircraft buss positive power input (10) and aircraft buss negative power input (20). Some smoothing of the voltage occurs when regulator input smoothing capacitor (30), of a type similar to axial lead ceramic capacitor KEMET part No. C104M5U5CA, 0.1 µF, 50 V, is placed across the terminals aircraft buss positive power input (10) and aircraft buss negative power input (20). The smoothed aircraft buss voltage is now presented to the voltage regulator module (40), similar to Douglas Electronics part No. LM317T (adjustable voltage regulator). The output voltage at regulated voltage output junction (50) is set by the values used for reference voltage resistor (60), of type similar to 270 ohms, ¼ W, 5%, and output voltage adjustment potentiometer (70), similar to BOURNS part No. 3266W-1-502, multiturn trimmer potentiometer (5 K). Voltage regulator module (40) maintains a constant reference voltage of 1.25 V across the regulated voltage output junction (50) and voltage adjustment junction (65). By physically adjusting output voltage adjustment potentiometer (70) using a screwdriver or other means, a technician may vary the steady state voltage available at regulated voltage output junction (50). Another capacitor, regulator output smoothing capacitor (80), similar to KEMET part No. C440C105M5U5CA, 1 µF, 50 V, is placed across the output voltage to smooth out variations at the regulated voltage output junction (50) caused by sudden movement of the window shade drive motor (540). Adjustment potentiometer wiper junction (75) is at the same potential as control module power common output (390). Reference voltage resistor (60) is connected to output voltage adjustment potentiometer (70) at voltage adjustment junction (65). The regulated and smoothed voltage is then passed on to the window shade drive motor (540) using up motor relay (90) and down motor relay (100).

When the remote control down switch (960) is depressed, a connection is made between remote control switch common junction (980) which is, in turn, connected to control module power common output (390), and control module second down command terminal (380). This causes current to flow through down relay coil (300) of down motor relay (100) through second down command diode (160), similar to Pioneer part No. 1N4148, causing the regulated and smoothed output voltage to pass current through relay upper coil junction (290) through down relay motor common terminal (270) to control module motor common terminal (360) and into window shade drive motor (540). If lower limit switch (530) has not been activated, current continues to pass from window shade drive motor (540) through motor limit switch terminal (535) into motor control module lower limit switch terminal (340). The motor current then passes through lower limit switch diode (130), similar to Pioneer part No. 1N4002, and on toward up relay limit switch input (200) and to up relay motor common output (210). The current then passes through down relay motor common input (250) and through down relay motor common junction (260) to control module power common output (390), thus completing the circuit. When lower limit switch (530) is activated by the movement of the aircraft window shade as it reaches the lower limit, the motor drive current flow will be interrupted, and downward movement of window shade drive motor (540) will cease. Even if the voltage at regulated voltage output junction (50) varies due to motor movement or friction between the window shade and its mounting, voltage regulator module (40) will operate to maintain the voltage at regulated voltage output junction (50) according to the formula:

$$V_{out} = V_{ref}\left(1 + \frac{R_2}{R_1}\right) + I*R_2,$$

where $V_{out}$ is the voltage across regulated voltage output junction (50) and control module power common output (390), $V_{ref}$ equals 1.25, $R_2$ is the value of resistance for output voltage adjustment potentiometer (70), R1 is the value of resistance for reference voltage resistor (60), and I is the current flowing from voltage regulator module (40) into voltage adjustment junction (65) (equal to approximately 100 µA). Since the current I is so small, the regulator voltage output junction (50) is maintained at a relatively constant voltage over a wide range of motor current fluctuations.

To move the window shade in an upward direction, remote control up switch (570) is depressed so as to complete a connection between control module second up command terminal (330) and remote control switch common junction (580) which is, in turn, connected to control module power common output (390). This action causes the voltage present at regulated voltage output junction (50) to be applied to up relay coil (180) of up motor relay (90), causing current to pass through up relay lower coil junction (170), through first up command diode (110), similar to Pioneer part No. 1N4148. Up motor relay (90) will then switch contacts, and the voltage present at regulated voltage output junction (50) will be applied so as to cause current to flow through up relay upper coil junction (190), through up relay limit switch input (200), and on through upper limit switch diode (140), similar to Pioneer part No. 1N4002, and out of control module upper limit switch terminal (350). The current now flows through upper limit switch (520) and into motor limit switch terminal (535). The window shade drive motor (540) is now activated by the current flowing through it and back into the motor control module (500) at control module motor common terminal (360), through down relay motor common terminal (270), down relay motor common output (280), up relay motor common input (220), up relay motor common junction (230), and on to control module power common output (390), completing the circuit. The motor will continue to operate until upper limit switch (520) is activated, which interrupts the current flow to the window shade drive motor (540), causing upward motor drive operation to cease.

As noted above, in order to stop the travel of the aircraft window shade more quickly, a shorting connection can be applied across at the up and down relay brake inputs (400) and (410). This shorts the windings of window shade drive motor (540). Of course, the shorting connection can only be applied when no regulated voltage is present across the control module lower and upper limit switch terminals (340), (350) and control module motor common terminal (360). Such a shorting connection could be applied as a mechanically delayed contact resulting from release of either remote control down switch (560) or remote control up switch (570).

Assuming that remote control switch assembly (550) is located proximate to the aircraft pilot for remote operation, a similar assembly could be located near individual passengers and connected to alternate remote up and down command input terminals (590) and (595). The necessary common connection would be made to control module power common output (390). In this case, a connection between alternate remote command input (590) and control module power common output (390) results in current passing through control module first up command terminal (320), first up command diode (110), similar to Pioneer part No. 1N4148, and up relay coil (180), causing up motor relay (90) to operate. Similarly, a connection between alternate remote down command input (595) and control module power common output (390) results in current passing through control module first down command terminal (370), first down command diode (150), similar to Pioneer part No. 1N4148, and down relay coil (300), causing down motor relay (100) to operate.

As is shown in FIG. 1, window shade drive motor (540) and upper and lower limit switches (520) and (530) can all be located in a single location, shown here as motor drive assembly (510). The aircraft voltage supply is shown also in FIG. 1 schematically as aircraft buss voltage source (600).

Figure 3:
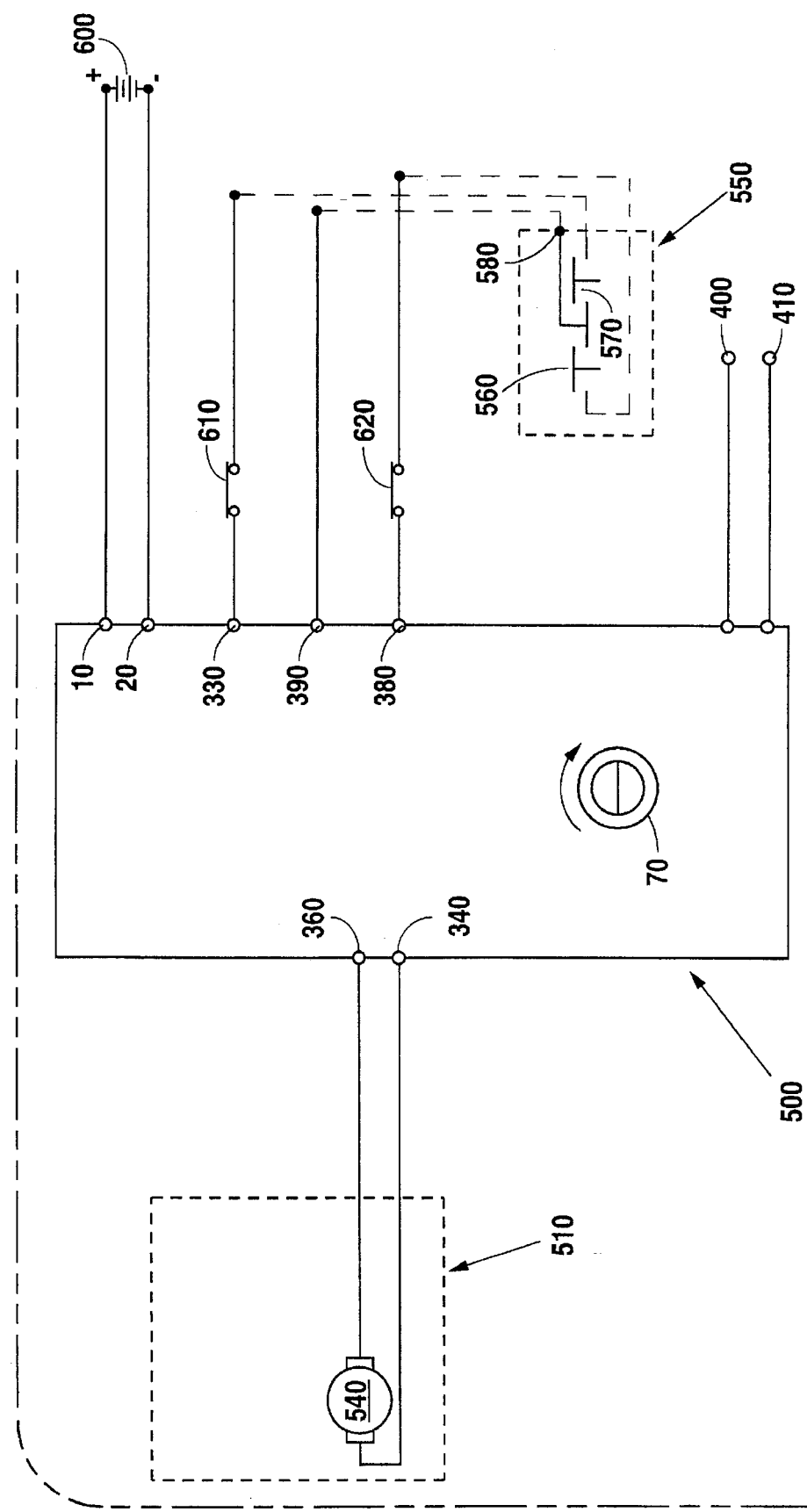
FIG. 3 illustrates the aircraft window shade speed regulation control module of applicants' present invention connected in a simplified configuration to the window shade drive motor assembly and limit switches connected to the input of the controller module.

Turning now to FIG. 3, a more simplified version of the aircraft window shade speed regulation control system is depicted. Instead of locating the limit switches at the output of motor control module (500), upper limit switch (610) is connected in between remote control up switch (570) and control module second up command terminal (330), and lower limit switch (620) is connected between remote control down switch (560) and control module second down command terminal (380). Exteriorly, the number of parts required to implement the aircraft window shade speed regulation control system has not changed. However, instead of having to pass the full motor current through the limit switches, only the relatively small current used to drive the up and down motor relays (90) and (100) must now be passed. This allows the use of smaller contacts within the limit switches themselves, with a resulting decrease in size of limit switches necessary to implement the aircraft window shade speed regulation control system. Also, only two wires need to be run out to window shade drive motor (540), instead of three.

Figure 4:
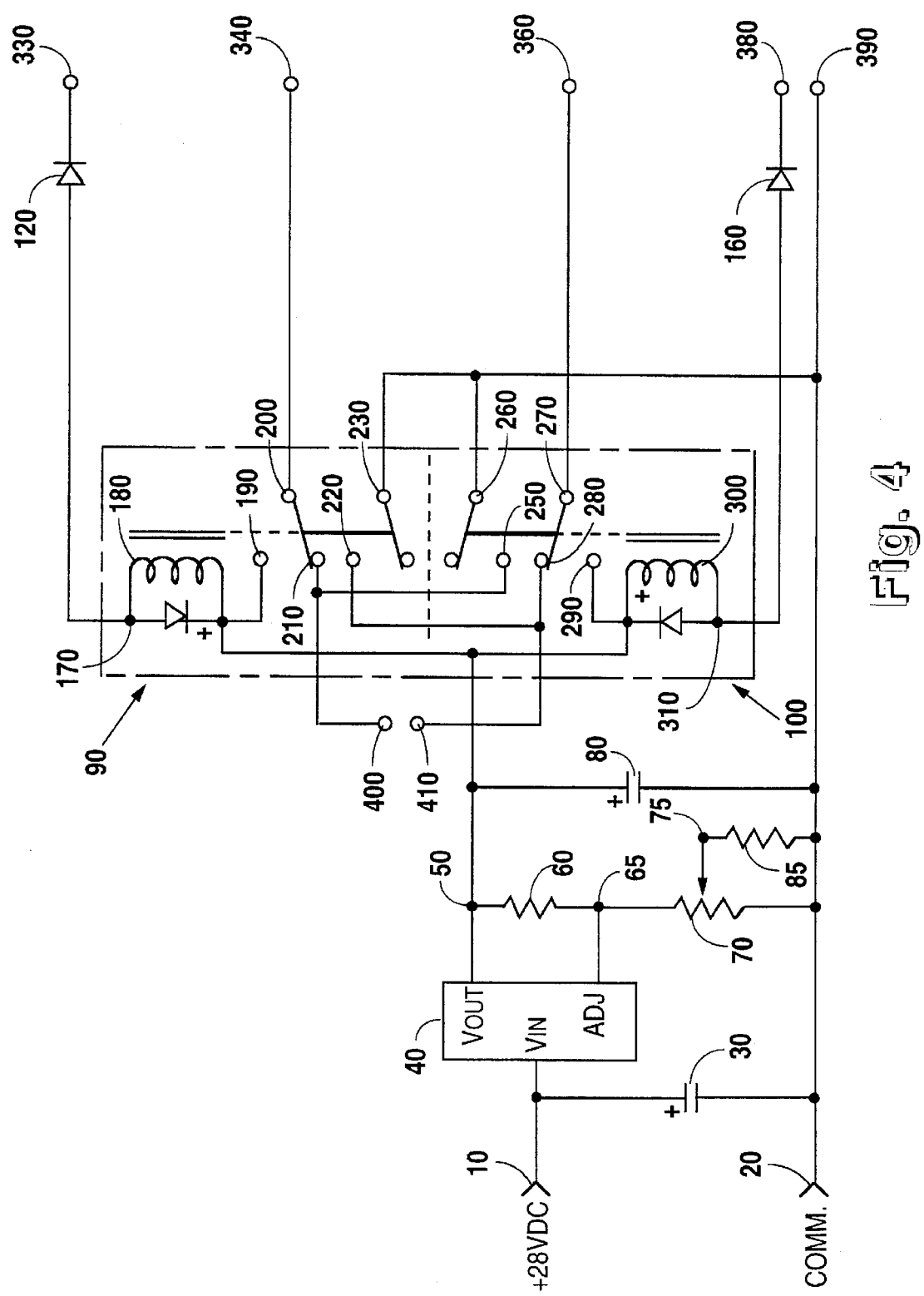
FIG. 4 illustrates an embodiment of an electrical circuit used to effect the functions of the aircraft window shade speed regulation control module of applicants' present invention using input limit switches.

Turning now to FIG. 4, it can be seen that operation of remote control down switch (560) effects a connection between remote control switch common junction (580) which, in turn, is connected to control module power common output (390) and control module second down command terminal (380). This will cause down motor relay (100) to be activated as current flows from regulated voltage output junction (50) through down relay lower coil junction (310) and second down command diode (160), similar to Pioneer part No. 1N4148. The current will also flow from down relay upper coil junction (290), through down relay motor common terminal (270) (after the contacts have switched) and out of control module motor common terminal (360) to window shade drive motor (540). The current will continue to flow into control module lower limit switch terminal (340), through lower limit switch diode (130), similar to Pioneer part No. 1N4002, through up relay limit switch input (200), through down relay motor common input (250), through down relay motor common junction (260), and on to control module power common output (390). The window shade drive motor (540) will remain active until lower limit switch (620) is activated, which causes the current flow to be interrupted to window shade drive motor (540) and downward movement of the window shade to cease.

In a similar fashion, activation of remote control up switch (570) causes a connection to be made between remote control switch common junction (580) which, in turn, is connected to control module power common output (390), and control module second up command terminal (330). This results in the activation of up motor relay (90) because voltage present at regulator voltage output junction (50) causes current to flow through up relay lower coil junction (170), through second up command diode (120), similar to Pioneer part No. 1N4148, out of control module second up command terminal (330), through remote control switch assembly (550), and into control module power common output (390). This causes the voltage present at regulated voltage output junction (50) to produce a current which flows from up relay upper coil junction (190), through up relay limit switch input (200), out of control module lower limit switch terminal (340), and into window shade drive motor (540). When the window shade drive motor (540) is activated, current continues to flow into control module motor common terminal (360), through up relay motor common input (220), through up relay motor common junction (230), and back to control module power common output (390), completing the circuit. The window shade drive motor (540) will remain active until upper limit switch (610) is activated, causing an interruption of the current flow to window shade drive motor (540). As mentioned above, a shorting connection can also be applied in this case at up and down relay brake inputs (400) and (410) to cause window shade drive motor (540) to stop more quickly. Even through passenger switch operating connections are not shown in FIG. 3, they may be applied as described in FIG. 1.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalencies that may be included in the spirit and scope of the invention as defined by the appended claims.

What is claimed is:

1. An aircraft window shade speed control system comprising:

an aircraft window having a window shade;

an electric motor, said electric motor connected to said window shade so as to move it between an open position and a closed position;

a motor control module, said motor control module powered by an aircraft power supply, said motor control module providing drive voltage to said electric motor, said drive voltage remaining within ±10% of a drive voltage set value as the current required by said electric motor varies over a range of ±50% of that required to operate said electric motor at said drive voltage set value;

at least one upper limit switch, said upper limit switch acting to shut off said electric current to said electric motor when said window shade reaches said open position;

at least one lower limit switch, said lower limit switch acting to shut off said electric current to said electric motor when said window shade reaches said closed position; and a remote operation switch, said remote operation switch having a first position, a second position, and a third position, said remote operation switch connected to said motor control module such that said drive voltage is applied with a forward polarity to said electric motor when said remote operation switch is moved to said first position, said drive voltage is applied with a reverse polarity to said electric motor when said remote operation switch is moved to said second position, and said drive voltage is removed from said motor when said remote operation switch is moved to said third position.

2. An aircraft window shade speed control system comprising:

an aircraft window having a window shade;

an electric motor, said electric motor connected to said window shade so as to move it between an open position and a closed position;

a motor control module, said motor control module powered by an aircraft power supply, said power supply providing a buss voltage to said motor control module, said motor control module providing drive voltage to said electric motor, said drive voltage remaining within ±10% of a voltage set value as said buss voltage varies over a range of ±50% of that required by said motor control module to operate said electric motor at said voltage set value;

at least one upper limit switch, said upper limit switch acting to shut off said drive voltage to said electric motor when said window shade reaches said open position;

at least one lower limit switch, said lower limit switch acting to shut off said drive voltage to said electric motor when said window shade reaches said closed position; and a remote operation switch, said remote operation switch having a first position, a second position, and a third position, said remote operation switch connected to said motor control module such that said drive voltage is applied with a forward polarity to said electric motor when said remote operation switch is removed to said first position, said drive voltage is applied with a reverse polarity to said electric motor when said remote operation switch is moved to said second position, and said drive voltage is removed from said motor when said remote operation switch is moved to said third position.

3. The aircraft window shade speed control system of claim 1, wherein said remote operation switch automatically returns to said third position when released from said first or said second positions.

4. The aircraft window shade speed control system of claim 1, wherein said drive voltage is provided to said electric motor by means of an integrated circuit voltage regulator module.

5. The aircraft window shade speed control system of claim 1, wherein said aircraft window shade speed control system is applied to a multiplicity of aircraft windows, each window having a window shade, a motor control module, at least one upper limit switch, at least one lower limit switch, at least one remote operation switch, and wherein all of said window shades may be operated simultaneously by the activation of at least one common switch.

6. The aircraft window shade speed control system of claim 1, wherein said drive voltage set value is adjusted by use of a single potentiometer.

7. The aircraft window shade speed control system of claim 5, wherein the movement speed of each of said window shades can be matched by adjusting a potentiometer on each of said motor control modules.

* * * * *